J. G. PAVYER.
MACHINE FOR SCOURING TYPE.

No 28,899. Patented June 26, 1860.

Witnesses: Amos Broadnax, C. Elwray

Inventor: James G. Pavyer

UNITED STATES PATENT OFFICE.

JAMES G. PAVYER, OF ST. LOUIS, MISSOURI.

MACHINE FOR SCOURING TYPE.

Specification forming part of Letters Patent No. 28,899, dated June 26, 1860.

*To all whom it may concern:*

Be it known that I, JAMES G. PAVYER, of the city and county of St. Louis, and State of Missouri, have invented a new and Improved Machine for Rubbing and Scouring Type; and I do hereby declare that the following is a full, clear, and exact description of the same, reference being had to the annexed drawings, making part of this specification, in which—

Figure 1:
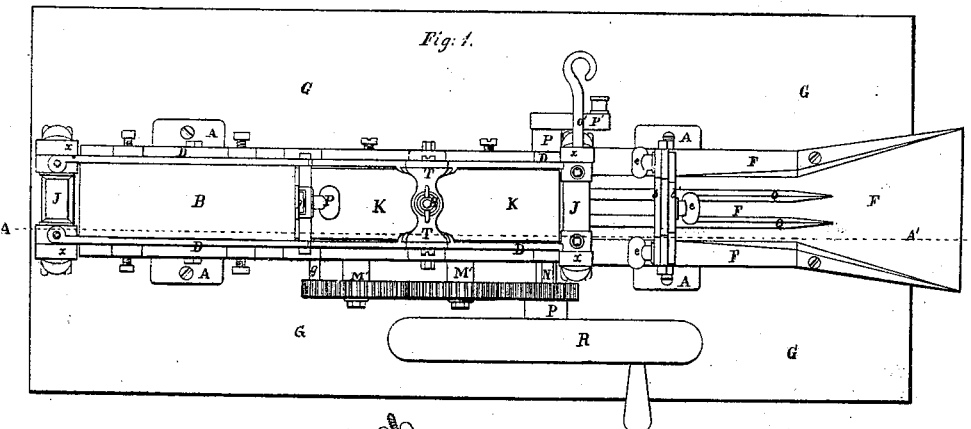
Figure 2:
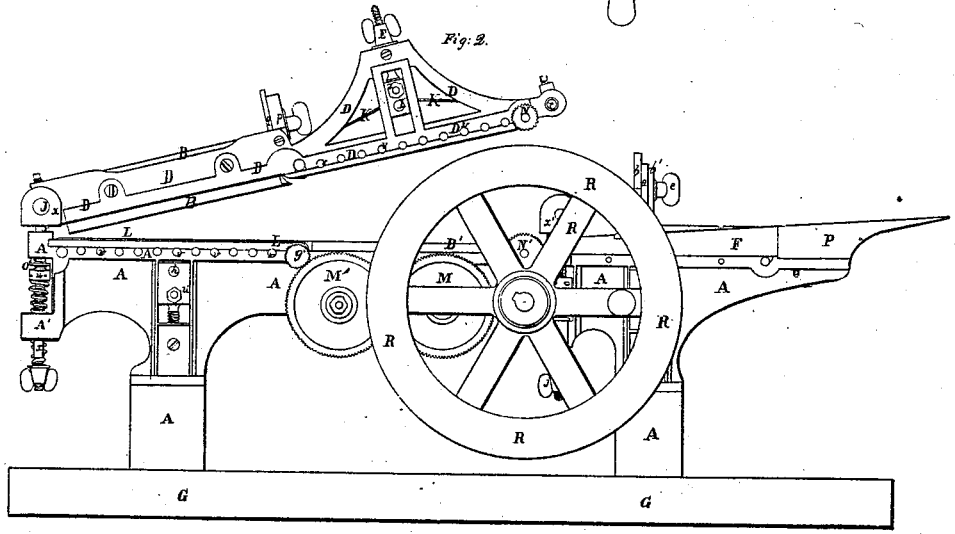
Figure 3:
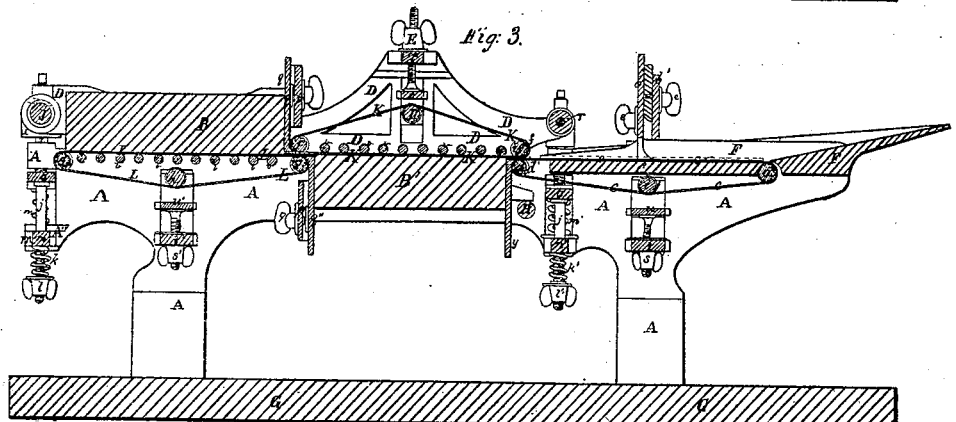

Figure 1 is a top view, Fig. 2 a side elevation, and Fig. 3 a vertical section through A' A'.

The following description will enable any one skilled in the arts to which my invention appertains to make and use the same.

Similar letters of reference represent corresponding parts of the different figures of the drawings annexed.

Upon the drawings, A represents the frame of my machine, which is composed of metal and made in the form shown; or it may be made of such other form as will best fill the conditions of strength and convenience. The aforesaid frame consists of two distinct parts, the inside surfaces of which are made plane and are united to each other by means of studs and screws, so as to leave an open space between them to receive the other parts or pieces which go to make up the machine. The said frame, being united as aforesaid, is fixed upon a bed-plate, G, as shown. About midway between the front and back end of the said frame a stone is introduced, wide enough to fill the space between the two sides of the frame. The said stone is shown at B', and is secured in the frame, as aforesaid, by means of a screw, $q$, which acts against a plate of metal, $q''$, so fixed in the frame as to bear against the stone in the manner shown. The opposite end of the said stone is pressed against the plate $y$, fixed in the frame to receive it. The screw $q$ passes through the stationary rib P, so as to jam the stone B' between the plates $q''$ and $y$.

At the front end of the stone B', and flush with its upper surface, an endless apron, $c\ c$, is arranged over a pair of rollers, $d\ d$. The upper part of this apron is supported by means of a rib, of wood or metal, fixed in the frame for that purpose, as shown at $c$, in case it should be found expedient to use it, and the said apron is drawn tight over the rollers $d\ d$ by means of the roller $i$, which is fixed in sliding journal-boxes attached to the screw $s$ through the agency of the cross-rod $u$, by which said journal-boxes are united, and by which they are moved up or down by means of the screw $s$, which passes through a stationary rib, $t$, which helps to unite the two parts of the frame.

At the back end of the stone B' another endless apron, L, is arranged over the rollers $g\ g$. The upper part of this apron is supported by means of a series of small rollers, $v\ v$, and the said apron is drawn tight by means of the roller $h$, which is arranged in the same manner and operated upon by similar means as is the roller $i$, above described.

Upon the top of the frame above described a second frame, D, is placed, which is constructed in a manner similar to the bottom frame, A, to which it is hinged at J, so that it may be raised off of the bottom frame, as shown in Fig. 2, or shut down close upon the bottom frame, as shown in Fig. 3. In one end of this frame D the stone B is fixed, by means of a screw and clamp, in substantially the same manner as the stone B' is secured in the frame A, and in the front end of this said frame D the endless apron K is arranged over the rollers $f\ f$. The lower surface of this apron is kept on a straight line by means of the series of small rollers $v\ v$, and the said apron is drawn tight over the rollers $f\ f$ by means of a stretcher consisting of the roller I, screw E, and cross-bar Z, arranged and operated in substantially the same manner as are the stretchers whereby the belts or aprons C C and L L are stretched over their respective rollers.

The frame D is secured to the frame A by means of yielding connections made at the points J and $r$. These connections may be made in any convenient way; but in this case they consist of the rods $x\ x$, the upper ends of which are made flat, with an eye in them to receive the pin which makes the connection between the frame D and the rods. Upon each of the said rods a screw-collar, $w$, is placed, which has a groove cut around it to receive the ends of the cross-head $o$, which extends from one of the said rods to the other, and under each of these said screw-collars and around the rods a spiral spring, $m$, is placed, which sets upon the lower part of the recess made in the frame to receive them, and these seats, upon which the springs set, are joined by means of a cross tail or bar, n, through which the rod K passes, upon the lower end of which there is also a spiral spring, k, placed, under which a thumb-nut, l, is placed for the purpose of supporting the spring and regulating its force. Both of these connections are alike, and by the use of them or similar ones the frame D will yield, so as to allow a small body to pass between it and the lower frame. F is a kind of receiving-hopper, into which the type is placed to be passed through the machine. The seed hopper or receiver is to be shaken by some kind of an arrangement applied to the machine for that purpose, so as to shake the type down upon the apron C C, and to make the type enter upon the apron on a line parallel with the line A' the receiver F is divided by the ribs Q in the manner shown, and to prevent one type from entering the machine on the top of another the gage b is fixed to the cross-rib a, so as to reach down between the ribs Q and close up the passage-way, save so much of it as is necessary to let one type pass through at the time. The ribs Q are fixed to the head-piece b', so that they may be taken out and replaced whenever it may be necessary.

Type after they are made have a small burr around their upper ends just at the foot or base of the form, which it is necessary to take off before they can be used. It is the object of my machine to take off this burr, which it does in the following manner. The type is introduced into the receiver F, from whence it passes on the apron C C, which carries it on the stone B', over which it is drawn by the friction of the belt K, which thus removes the burr from one side of it. The type is now carried forward by the belt L under the stone B, which cleans the burr off of the other side of it, and thereupon it is discharged out of the back end of the machine. The yielding nature of the connections J and r allows the type to pass between the stone and the belts when the frame D is down in the position shown in Fig. 3 and secured by the pin o.

The machine is set in motion by the application of power to the wheel R or crank P', upon the shaft of which a cog-wheel is fixed so as to mesh into the pinion N', which gives motion to the belt C C, and this pinion also gives motion to the belt K by meshing into the pinion N on the roller d', over which the said belt is stretched. The belt L is put in motion through the agency of the cog-wheels M M', which receive their motion from the wheel on the main shaft P, and which mesh in the pinion g on the shaft g', over which the said belt is stretched.

Having thus described the construction and operation of my improved type-scouring machine, what I claim as new, and desire to secure by Letters Patent, is—

1. Application of endless aprons or their equivalents to stones or their equivalents, substantially in the manner described, for the purpose specified.

2. Connecting the upper and lower stones and aprons with each other by means of yielding connections, so as to allow the type to pass between them, and so that they will adjust themselves to the different thicknesses of type, substantially as described.

JAMES G. PAVYER.

Witnesses:
AMOS BROADNAX,
C. E. GRAY.